United States Patent Office 2,733,274
Patented Jan. 31, 1956

2,733,274

PRODUCTION OF PHENOLS

Charles Thomson Young Cowie, Norton-on-Tees, England, assignor to Imperial Chemical Industries Limited, a corporation of Great Britain No Drawing. Application March 30, 1951,
Serial No. 218,544

Claims priority, application Great Britain April 11, 1950

4 Claims. (Cl. 260—624)

This invention relates to the production of tri-alkylated phenols.

It has already been proposed to produce tri-alkylated phenols by treating materials containing phenols having fewer substituent alkyl groups with an olefine in the presence of catalytic quantities of an acidic catalyst such as sulphuric acid or a sulphonic acid. This process of alkylation has usually been carried out at moderately elevated temperatures e. g. in the neighbourhood of 70° C., as it has been accepted that such temperatures were essential for satisfactory operation in a commercial process. In particular, in Industrial and Engineering Chemistry 35 (1943) pages 264 to 272 and pages 655 to 660, there has been described a process for the butylation of a mixture of meta and para cresols to give the corresponding 4-methyl-2,6-di-tertiary butyl phenol and 3-methyl-4,6-di-tertiary butyl phenol in which the cresols are treated with a gas comprising isobutene at a temperature of 60° to 70° C. in the presence of 3% to 5% by weight of concentrated sulphuric acid, based on the cresols initially present.

An investigation of a typical product from the process of butylating cresols at a temperature of about 70° C., to produce di-butylated products, shows that it contains considerable proportions of mono-butyl cresols and of butene polymer, mainly tri-isobutene, together with secondary-butyl derivatives from the cresols and normal butenes present in the olefine-containing gas. The production of these substances is undesirable, as they represent a loss of valuable reactant or reactants and thus a decrease in the potential yield of di-butylated products, and furthermore, due to their physical properties, these undesired substances are difficult to separate from the reaction product.

We have now found that by carrying out the alkylation step at temperatures in the range of 20° C., to 50° C., very much lower proportions of these undesired products appear in the crude reaction product which also contains a high proportion of those tri-alkyl phenols which are easily separated by simple means, such as distillation, the separated alkyl phenols being in general of higher purity than those obtained from the products of alkylation at higher temperatures.

According to the present invention therefore there is provided a process for the production of 3-methyl-4,6-di-tertiary butyl phenol and/or 4-methyl-2,6-di-tertiary butyl phenol which comprises bringing gaseous isobutene into contact with mixtures comprising meta and para cresols in the presence of an alkylation catalyst, the temperature being maintained in the range 20° to 50° C. and thereafter separating from the reaction mixture the desired phenol or phenols.

While the process of the present invention gives satisfactory results in the above-defined temperature range, we have found that particularly satisfactory results are obtained by operating at a temperature of about 40° C. The isobutene containing gas may be substantially pure isobutene as obtained for example by the dehydration of isobutanol or tertiary-butanol, or it may be contained in a mixture with other gases, such as the olefine-containing gases obtained from processes for the production of motor spirit from coal or creosote oil or from the cracking of petroleum. More particularly it may be the so-called $C_4$ cut from such gases, this cut containing isobutene, normal butenes and butanes.

Mixtures from a variety of sources comprising meta and para cresols but containing substantially no ortho cresol are suitable for use according to the present invention. Thus, commercially available cresylic acid fractions from coal tar and cresol fractions separated therefrom may be used. Examples of suitable cresol-containing mixtures are commercially available cresylic acids known as 49/51 and 52/53 cresylic acids, i. e. containing respectively 49 to 51% or 52 to 53% by weight of meta cresol. Other tar acid mixtures which may be used are those consisting chiefly of meta and para cresols together with minor proportions of 2:4- and 2:5-xylenols.

As hereinbefore stated, the process of the present invention is carried out in the presence of an alkylation catalyst, which may be sulphuric acid, oleum, an organic acid such as a sulphonic acid or a Friedel-Crafts catalyst such as a metal halide. Suitable sulphonic acids are phenol sulphonic acids. More preferably a catalyst comprising a mixture of meta and para cresol sulphonic acid is used: a sulphonic acid catalyst prepared from the mixture comprising meta and para cresols to be alkylated is very suitable. There may be used an alkane sulphonic acid such as ethyl sulphonic acid. The quantity of these catalysts which may be present can be varied considerably: up to 20% by weight of the total phenols present will give satisfactory results, although lower amounts, e. g. between 5% and 10% are convenient.

In general the process will be continued until the desired amount of isobutene has been absorbed in the reaction mixture, as judged for example by the increase in the weight of the latter. The reaction mixture may then be treated for the separation of the desired products, for example by washing and neutralisation with dilute aqueous alkali such as caustic soda or alkali metal carbonate, at temperatures of the order of 50 to 60° C. followed by fractional distillation of the neutralised crude, washed product to give fractions consisting essentially of, or rich in the desired phenols. Where phenol mixtures containing considerable amounts of 2:5-xylenol are used, unalkylated 2:5-xylenol and 2:5-dimethyl-4-tert-butyl phenol produced in the reaction are removed by the caustic soda washing and may be recovered and separated by neutralisation of the aqueous caustic soda solution followed by fractional distillation of the resulting phenolic layer.

Due to the proximity of their boiling points, the separation of meta- and para-cresols is difficult, but this separation is facilitated by the use of the process of the present invention. Thus, after butylation and separation from the reaction mixture of the individual di-butylated cresols, the latter may be de-butylated for example by heating at a temperature in the range 100° C. to 200° C. in the presence of an acidic catalyst such as sulphuric acid, to give the corresponding cresols.

A further feature of the present invention is therefore the debutylation of the dibutylated cresols after they have been separated from the reaction mixture, to give the individual cresols. The de-butylation of the di-butylated cresols may be carried out in any convenient manner. It is preferable to carry out the de-butylation by heating the separated alkylated cresols with a small proportion of an acidic catalyst, which may be sulphuric acid, oleum, an organic sulphonic acid or a Friedel-Crafts type catalyst such as a metal halide. Only small proportions of acidic catalyst are required, for example up to 5% by weight of the alkylated phenol being treated, but we have found that satisfactory results are obtained with 0.1% to 0.2% by weight of catalyst.

The temperatures at which de-butylation is carried out may vary within wide limits: those in the range 150° to 200° C. give satisfactory results.

The following record of experiments illustrates the benefits obtainable by operating according to the process of the present invention. In these experiments there was used a commercial cresylic acid containing by weight 53% of meta cresol, 35% of para cresol, 4% of phenol and ortho cresol, 5% of 2:4- and 2:5-xylenols and about 1% of higher boiling tar acids.

*Example 1*

324 grams of the above defined cresylic acid was treated at 70° C. with a butylating gas and in the presence of 32 grams of cresol sulphonic acid previously formed by reacting equimolecular amounts of the cresylic acid to be treated and of oleum (20% $SO_3$) for 1 hour at 100° C.; the butylating gas contained 15 to 20% of isobutene. The reaction was continued until 344 grams of gas had been absorbed corresponding approximately to a butylene/cresol molar ration of 2:1. Dissolved gases were removed by blowing nitrogen through the reaction mixture when it was found that the increase in weight due to reacted isobutene was 335 grams. The crude product was washed with about 1 litre of a 10% aqueous solution of caustic soda and subsequently with two 1 litre portions of water, the washing being carried out at 50° C. 646 grams of wet, washed product were produced. A portion of this product was fractionally distilled under a reduced pressure (20 mms. mercury) to give the following fractions, the percentages being by volume of the portion of crude product distilled.

| Fraction | Percentage | Temperature, °C. |
|---|---|---|
| Light ends: mainly water | 3 | Up to 60. |
| Butene trimer | 10 | 60 to 110. |
| Monobutylated tar acids | 27 | 110 to 141. |
| 4 methyl, 2:6-di-tertiary butyl phenol | 30 | 141 to 155. |
| 3 methyl, 4:6-di-tertiary butyl phenol plus residue. | 30 | 155 to 165. |

The monobutylated tar acids fraction contained about 8% of 2:4-dimethyl, 6-tertiary butyl phenol, about 52% of 3 methyl, 6-tertiary butyl phenol and about 23% of 4-methyl, 2-tertiary butyl phenol together with some 4 methyl, 2:6-di-tertiary butyl phenol. The 4 methyl, 2:6-di-tertiary butyl phenol fraction contained about 75% of that phenol.

*Example 2*

The experiment of Example 1 was repeated, but at a temperature of 40° C. 372 grams of gas were absorbed and after treatment with nitrogen as above described, the increase in weight due to isobutene was found to be 342 grams. The weight of wet, washed product was 696 grams. Fractionation of a sample of this product under 20 mm. pressure of mercury (absolute) gave the following results.

| Fraction | Percentage | Temperature, °C. |
|---|---|---|
| Light ends: mainly water | 9 | 60 |
| Butene trimer | Nil | |
| Monobutylated tar acids | 7 | 110 to 141 |
| 4 methyl, 2:6-di-tertiary butyl phenol | 35 | 141 to 155 |
| 3 methyl,4:6-di-tertiary butyl phenol | 37 | 155 to 165 |
| Residue | 10 | |

The monobutylated tar acids fraction contained by volume 54% of 2:4-dimethyl, 6-tertiary butyl phenol, 33% of 3-methyl, 6-tertiary butyl phenol and 5% of 4-methyl, 2-tertiary butyl phenol, some 4-methyl, 2:6-di-tertiary butyl phenol being present. The 4 methyl, 2:6-di-tertiary butyl phenol fraction contained about 85% of that phenol, while the 3-methyl, 4:6-di-tertiary butyl phenol fraction contained about 95% of that phenol.

In comparing the results of Examples 1 and 2 it will be seen that by operating at the lower temperature there is no production of butene trimer, the amount of monobutylated tar acids is decreased and the amounts of the fractions containing the desired phenols are considerably increased.

*Example 3*

275 grams 3-methyl-4,6-di-tertiary butyl phenol of 95% purity, obtained from the product of butylating meta and para cresols according to the present invention were heated with 0.1% of their weight of concentrated sulphuric acid at a temperature in the range 150° C. to 200° C. until evolution of isobutene ceased. Of the isobutene evolved, 95% was recovered, the remainder appearing as polymers. The residue was fractionally distilled to give an 85% yield of meta cresol of better than 95% purity.

While the use of higher amounts of sulphuric acid in the debutylation reaction gave results comparable with the above, with respect to yield and purity of cresol obtained, the recovery of isobutene was decreased due to increased formation of poymers.

It has already been proposed to produce alkylated phenols by first reacting olefines with a phenol in the presence of an acidic catalyst at temperatures in the neighbourhood of 50° C., but such first reaction step has been followed by a heating step at higher temperatures, for example up to 150° C., to cause isomerisation of the initial reaction products to the desired phenols. No such isomerisation step is undertaken in the process of the present invention.

I claim:

1. A process for the production of 3-methyl-4,6-di-tertiary butyl phenol and 4-methyl-2,6-di-tertiary butyl phenol, which comprises the steps of contacting a mixture comprising predominantly meta and para cresols in the presence of a catalytic quantity of at least one cresol sulphonic acid with gaseous isobutene while said mixture is maintained at a temperature within the range of 20° to 50° C. until 2 mols of isobutene have been added for every mol of cresol present, whereby the desired methyl di-tertiary butyl phenols are obtained, and thereafter separating from the reaction mixture the desired phenols.

2. A process as recited in claim 1 in which the temperature is maintained at 40° C.

3. A process as recited in claim 1 in which said mixture comprising predominantly meta and para cresols contains approximately 49 to 53% by weight of meta cresol.

4. A process as recited in claim 1 in which said cresol sulphonic acid is added to said mixture in the amount of from 5 to 10% by weight of the total phenols present prior to contacting said mixture with said gaseous isobutene.

References Cited in the file of this patent

UNITED STATES PATENTS

| | | |
|---|---|---|
| 1,954,985 | Buc | Apr. 17, 1934 |
| 2,051,473 | Evans et al. | Aug. 18, 1936 |
| 2,149,759 | Cantell | Mar. 7, 1939 |
| 2,181,823 | Stevens et al. | Nov. 28, 1939 |
| 2,297,588 | Stevens et al. | Sept. 29, 1942 |
| 2,428,745 | Stillson | Oct. 7, 1947 |
| 2,537,337 | Fearey | Jan. 9, 1951 |
| 2,560,666 | Stevens et al. | July 17, 1951 |